US009721354B2

(12) United States Patent
Baker (10) Patent No.: US 9,721,354 B2
(45) Date of Patent: *Aug. 1, 2017

(54) STOP WEIGHTED WAVEFORM (71) Applicant: Tektronix, Inc., Beaverton, OR (US)

(72) Inventor: Daniel G. Baker, Beaverton, OR (US)

(73) Assignee: TEKTRONIX, INC., Beaverton, OR (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/826,116

(22) Filed: Aug. 13, 2015

(65) Prior Publication Data
US 2015/0348281 A1 Dec. 3, 2015

Related U.S. Application Data (63) Continuation of application No. 14/313,794, filed on Jun. 24, 2014, now Pat. No. 9,317,931.
(Continued)

(51) Int. Cl.
G06K 9/00 (2006.01)
G06T 7/40 (2017.01)
H04N 5/222 (2006.01)
H04N 5/232 (2006.01)
H04N 5/235 (2006.01)
G06T 5/00 (2006.01)

(52) U.S. Cl.
CPC ............ *G06T 7/408* (2013.01); *G06T 5/007* (2013.01); *H04N 5/2228* (2013.01); *H04N 5/2351* (2013.01); *H04N 5/23293* (2013.01); *G06T 2207/10004* (2013.01); *G06T 2207/10016* (2013.01); *G06T 2207/10024* (2013.01); *G06T 2207/10144* (2013.01); *G06T 2207/10152* (2013.01); *G06T 2207/20208* (2013.01)

(58) Field of Classification Search
CPC . G06T 2207/10004; G06T 2207/10024; G06T 2207/10152; G06T 7/0018; G06T 7/408; H04N 5/2228; H04N 5/23293; H04N 5/2351

See application file for complete search history.

(56) References Cited

U.S. PATENT DOCUMENTS 6,148,113 A 11/2000 Wolverton
9,317,931 B2 * 4/2016 Baker .................. G06T 7/408
(Continued)

FOREIGN PATENT DOCUMENTS

EP 1976307 A1 1/2008
EP 2332580 A1 6/2011

OTHER PUBLICATIONS

CINELITE On-Picture Exposure Measurements, http://www.leaderamerica.com/cinelite-cinezone-5-bar-display, Dec. 31, 2014, 2 pages, Leader.
(Continued)

Primary Examiner — Phuoc Tran
(74) Attorney, Agent, or Firm — Marger Johnson (57) ABSTRACT A waveform monitor includes a brightness measuring system to generate brightness values that are then converted to stop equivalents. The conversion may be performed using a Look Up Table. The output is generated as a stop vs. time waveform. Methods of generating the stop vs. time waveform are also described.

17 Claims, 6 Drawing Sheets
(1 of 6 Drawing Sheet(s) Filed in Color)

Related U.S. Application Data (60) Provisional application No. 61/975,566, filed on Apr. 4, 2014.

(56) References Cited

U.S. PATENT DOCUMENTS

| | | |
|---|---|---|
| 2003/0081141 A1 | 5/2003 | Mazzapica |
| 2009/0046155 A1 | 2/2009 | Jacumet |
| 2013/0332866 A1 | 12/2013 | Johnson |

OTHER PUBLICATIONS

Focus Peaking, http://en.wikipedia.org/wiki/Focus_peaking, Dec. 31, 2014, 1 page, Wikipedia.
European Search Report, dated Jun. 17, 2015, EP Patent Application 15162453.3, 6 pages.

\* cited by examiner

STOP WEIGHTED WAVEFORM

CROSS REFERENCE TO RELATED APPLICATIONS

This application is a continuation of U.S. Non-provisional application Ser. No. 14/313,794, entitled F-STOP WAVEFORM DISPLAY WITH PICTURE MARKERS, filed Jun. 24, 2014, which claims benefit of US Provisional application 61/975,566, entitled F-STOP WEIGHTED WAVEFORM DISPLAY WITH PICTURE MARKERS VIA CURSORS, filed on Apr. 4, 2014, the teachings of which are incorporated herein by reference.

TECHNICAL FIELD

This disclosure is directed to a method of displaying information on a monitor, and, more particularly, to an apparatus to monitor a camera output signal waveform, and associated methods of use.

BACKGROUND

"On-set" or "on-site" video and film production often requires the use of incident and reflected (spot) light-meters to adjust scene lighting and camera gain or aperture. Many times the light-meter measurement and lighting adjustments are done in relative values such as F-stops. F-stops are well known and derive from film exposure and camera aperture or speed adjustment, which is typically adjusted in F-stop increments. The so called F-stop derives from the Focal Ratio or F-number, a dimensionless ratio of focal-length divided by the effective aperture of the camera lens. For example, one f-stop, or "stop", corresponds to an area increase of 2× or 3 dB in light power but the F-number changes by only sqrt(2). It is typically the F-number that is marked on the lens iris or aperture adjustment.

Presently, both film production and video production use electronic imagers within the cameras typically providing a very large dynamic range and adjustable gain (6 dB/stop). For example, according to Wikipedia, film negatives have about 13 stops compared to 14.4 stops for a typical (e.g., Nikon D800) DSLR camera. In video and movie film production, the traditional Gamma (power-law) correction as well as newer log processing within the camera can maintain a large portion of that dynamic range when compressed into a 12-bit or even 10-bit resolution digital video output. It is very important to determine how well that dynamic range is being utilized based on camera adjustment (gain/aperture) and scene lighting. Typically this is done on the camera output signal by viewing the output on a picture monitor (<10 stops of dynamic range). Also note that by simply looking at a well calibrated picture monitor, the dynamic range is limited by the adapted eye to about 7 stops, which leaves invisible detail in the dark portions of the output. A video Waveform Monitor is often also used, but currently these Waveform Monitors are limited to linear voltage indications, with much of the dynamic range near black compressed into just a few mV near 0. Much like the case for analyzing high dynamic range Radio Frequency (RF) signals, a linear waveform scaling is not adequate.

Embodiments of the invention address these and other issues in the prior art.

SUMMARY OF THE DISCLOSURE

Embodiments of the invention include an apparatus to receive an image at an image input, measure brightness values for pixels from the original image received, convert the measured brightness value to generate stop values, and generate a stop vs. time waveform therefrom.

Embodiments also include methods of generating a display for output from a measurement instrument. The method may include receiving an original image, extracting brightness information from the image, converting the brightness information of the image pixels to stop equivalents, and displaying the stop equivalents versus a time value.

In addition, embodiments include a system for assessing live video from a camera. Such a system may include a camera structured to generate a video output and a waveform monitor having with a monitor for viewing a measurement display. The waveform monitor of the system includes a measuring system to measure brightness values for pixels from an original image received at an image input, a converter structured to generate stop values from the measured brightness values, and an output generator structure to generate a stop versus time waveform. In some embodiments the converter may use a Look Up Table.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

As mentioned above, embodiments of the invention may be used to assess a live video signal from a cameras in terms of relative f-stops (log 2 scale) as well as the traditional, linearly displayed, voltage or IRE level. This effectively converts even an analog camera output into a light-meter for relative lighting and exposure in terms of "stops" or "f-stops".

Figure 1:
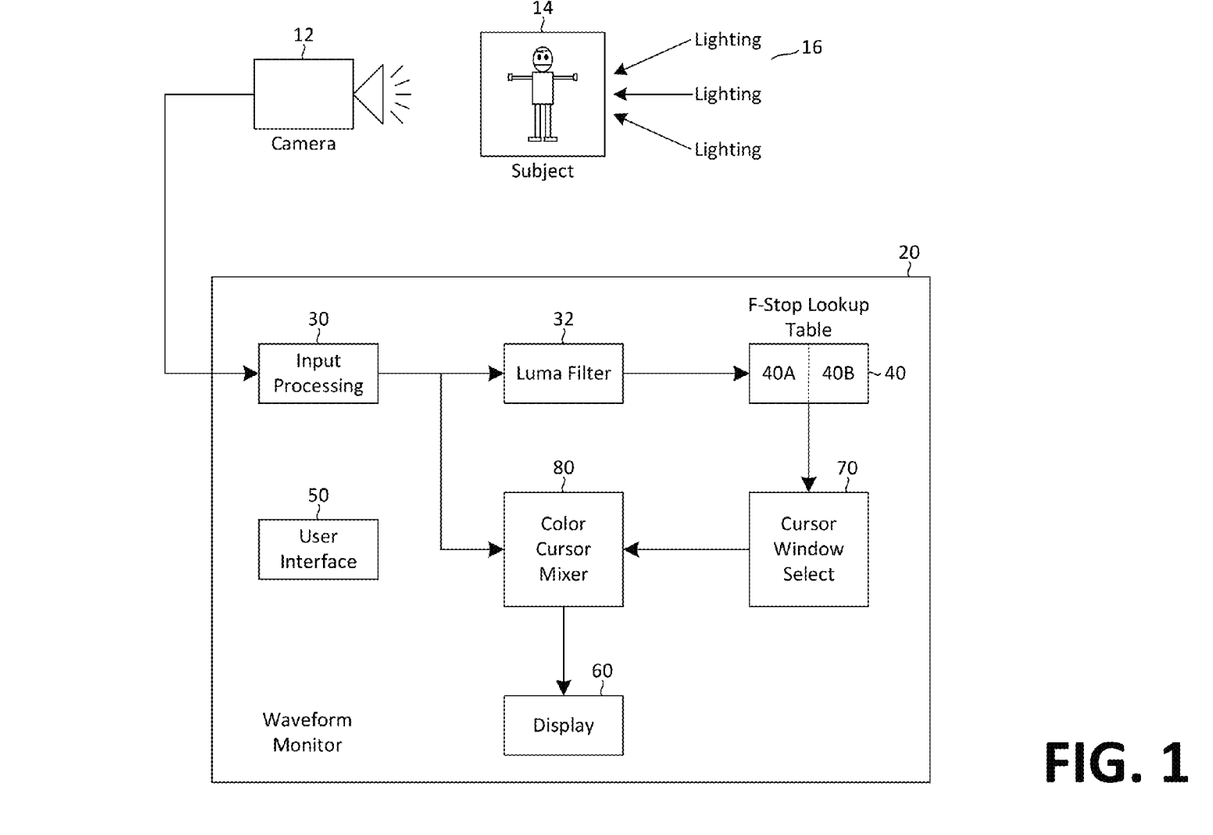
FIG. 1 is a block diagram of an example Video Waveform Monitor including monitor markers according to embodiments of the invention.

FIG. 1 is a block diagram showing material portions of an example Video Waveform Monitor according to embodiments of the invention. As illustrated in FIG. 1, a Waveform Monitor 20 is coupled to and receives input from a camera 12 that is pointed at a subject 14 that is lit by lighting 16. The camera 12 typically includes adjustments for aperture and exposure index that may be controlled by a camera operator, or the adjustments may be automatically controlled. The camera output is input to the Waveform Monitor 20.

Figure 2A:
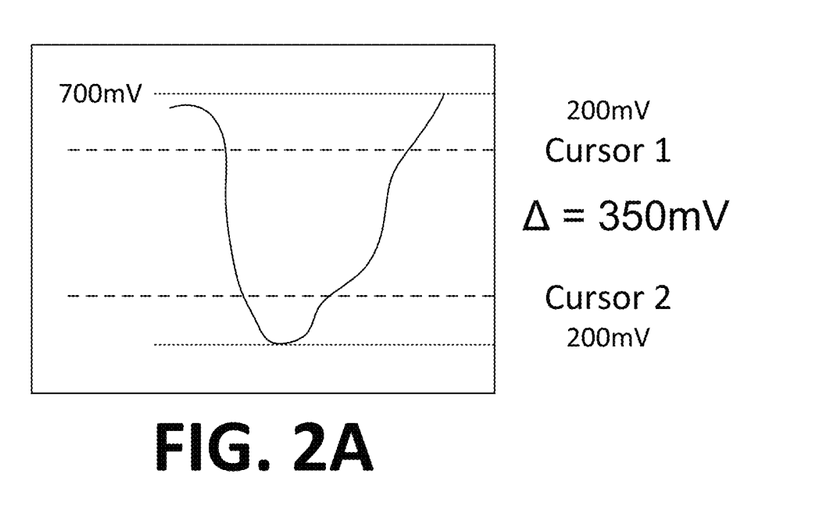
FIG. 2A is an example display output of a conventional voltage vs. time waveform.
Figure 2B:
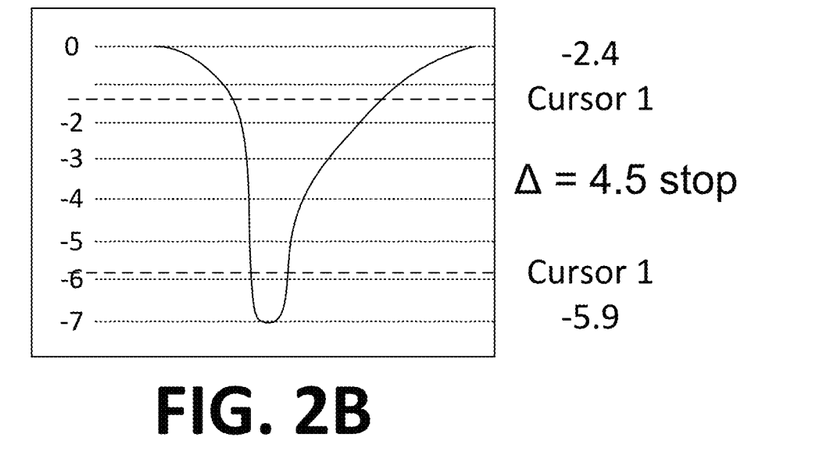
FIG. 2B is an example display output of a new f-stop vs. time waveform produced by the Waveform Monitor of FIG. 1.

The camera 12 output is first processed by an input processor 30 before passing through a filter 32, such as a low pass filter, that may be turned on or off by the user, such as through a user interface 50. The filtered or non-filtered output is fed to a Look Up Table (LUT) 40 that has been loaded with preset tables through the user interface 50. One portion of the LUT 40, 40A, may be used to remove the gamma or log processing on the luma signal. This process converts the luma signal to a linear light representation. Another portion of the LUT 40, 40B, may be used to convert the luma signal to a $Log_2(Y/Ymax)$ scale to provide a real-time, f-stop luma signal for a waveform display, such as illustrated in FIG. 2B. To reduce the size of the LUTs, both mathematical processes are typically multiplied and scaled with high precision before converting to a single set of integer LUT words, thereby eliminating the need for the large word size needed to represent the wide dynamic range of linear light values.

There may be multiple LUTs stored in the Waveform Monitor 20. The user may use the user interface 50 to control which of the stored LUTs is loaded as the active LUT 40. For example, various LUTs may be pre-stored in the Waveform Monitor 20 that allow user to select the active LUT 40 based on camera gamma and black level.

A display monitor 60 on the Waveform Monitor 20 displays output to the user. While the monitor 60 may be used to show the traditional voltage vs. time waveform, such as illustrated in FIG. 2A, it may also be used to show a new f-stop vs time waveform, such as illustrated in FIG. 2B. The new f-stop vs time waveform display may use the same user-adjustable cursors as the traditional voltage vs time display, except the output is scaled in "stops" rather than voltage. The horizontal time base is the same for both displays, as illustrated in FIGS. 2A and 2B, having the conventional selections such as 1-line, 2-line and field sweeps, for example.

In addition, a cursor window select block 70 may accept user input from the user interface 50 to read adjustable cursor values set by the user. These adjustable cursor values may be used as binary gate signals to modify an otherwise monochrome output of the Waveform Monitor 20. More specifically, a color cursor mixer 80 may be coupled to receive the processed input signal from the input processor 30, or from elsewhere in the Waveform Monitor 20. The color cursor mixer 80 is also coupled to the cursor window select block 70. Binary gate signals from the cursor window select block 70 may be used to determine which areas of the original monochrome output will be colored, thus highlighting particular regions of the output, as described below.

Figure 3:
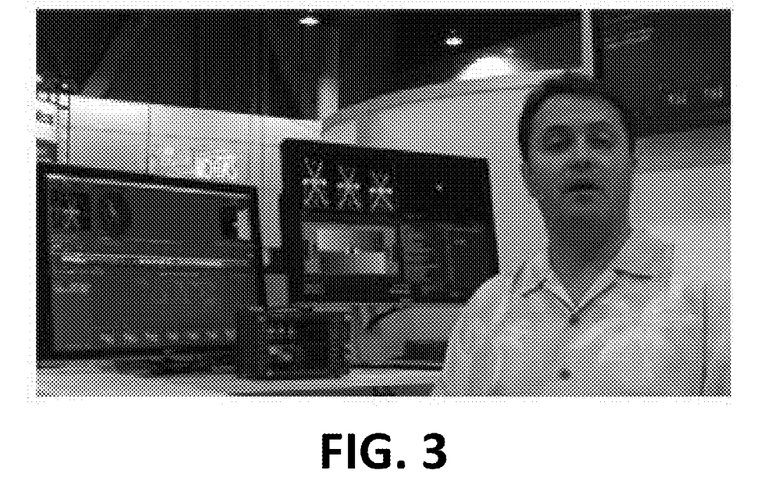
FIG. 3 is a base image capture used to illustrate embodiments of the invention.
Figure 6:
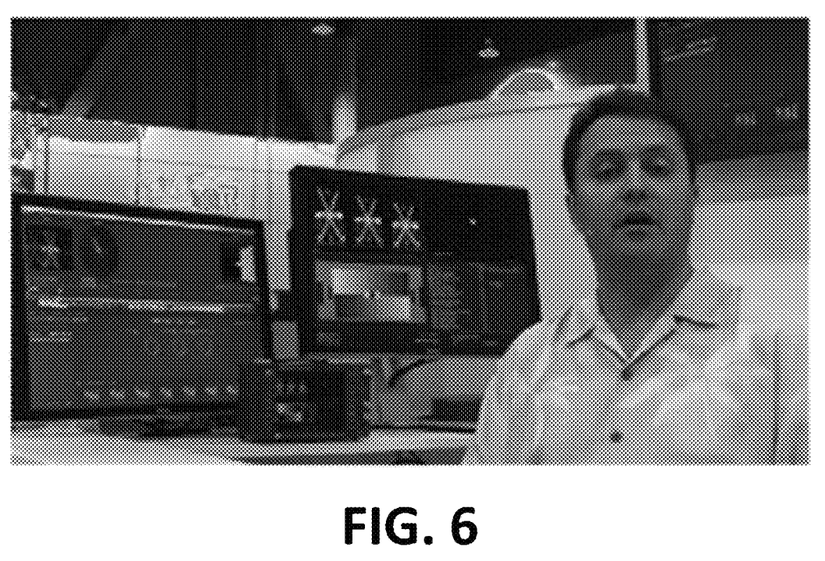
FIG. 6 is the image capture of FIG. 3 that has been modified with color highlighting according to embodiments of the invention.

For example, comparing output FIGS. 3 and 6, FIG. 3 is an original monochrome output, while the output of FIG. 6 is the original monochrome picture that has been highlighted in color to identify areas of the picture that fall within the f-stop windows selected by the user. Whereas the image capture shown in FIG. 3 is a Luma-only or monochrome picture, in FIG. 6 two color windows are added, for example red and blue, as described in more detail below.

To produce the output of FIG. 6, with reference back to FIG. 1, the $log_2(Y)$ signal from the LUT 40, and specifically from the LUT 40B, is compared with two user controllable window detectors in the control block 70. Users may control the position and size of cursor "windows". More specifically, in one embodiment, users may control the center f-stop value as well as the size of the cursor window. The window is used by the system to create binary gate signals. F-stop values from the luma output falling within the specified cursor window are shown on the display as colored pixels, providing information to the user about which pixels in the output fall within the f-stop window. The remaining pixels, i.e., those pixels having brightness levels outside of the specified cursor window from the original image, may be shown on the display without change.

Windows may be adjusted in, for example, ¼ stop (f-stop) increments. For example, the window could be pre-configured to plus and minus ¼ stop from the user controllable center f-stop value adjustable over the entire range of the signal from the LUT 40. In this way, the user can adjust the cursor to highlight any particular region of the picture to determine from the cursor value on the f-stop waveform in FIG. 2B or FIG. 5 the f-stop value, within ¼ stop, of that particular region of the picture as well as other regions with substantially the same f-stop value.

The color cursor mixer 80 generates the coloring signals, for example the red and blue pixels for combining with the original image to produce the modified image as illustrated in FIG. 6. In one embodiment the color cursor mixer 80 merely replaces the original pixels that fall within the f-stop window with monochromatic red or blue, for instance. In other embodiments the color cursor mixer 80 may generate a blended output by adding a color hue to the underlying luma data. Also, although these examples show a monochrome base image, embodiments of the invention are not limited to luma only, and may be performed in each color channel, for example red, green, blue, independently.

In the illustrated embodiment of FIG. 6, two colored cursor windows are presented, although more or fewer windows could be produced by the Waveform Monitor 20.

Figure 4:
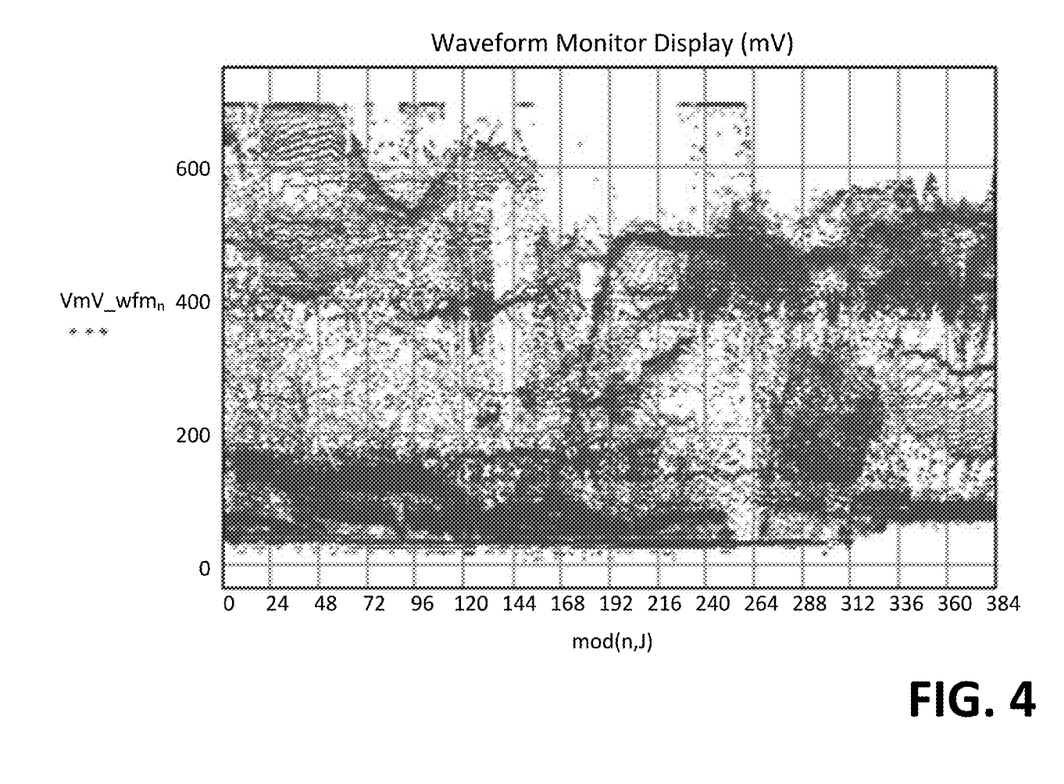
FIG. 4 illustrates a traditional voltage waveform for the image of FIG. 3
Figure 5:
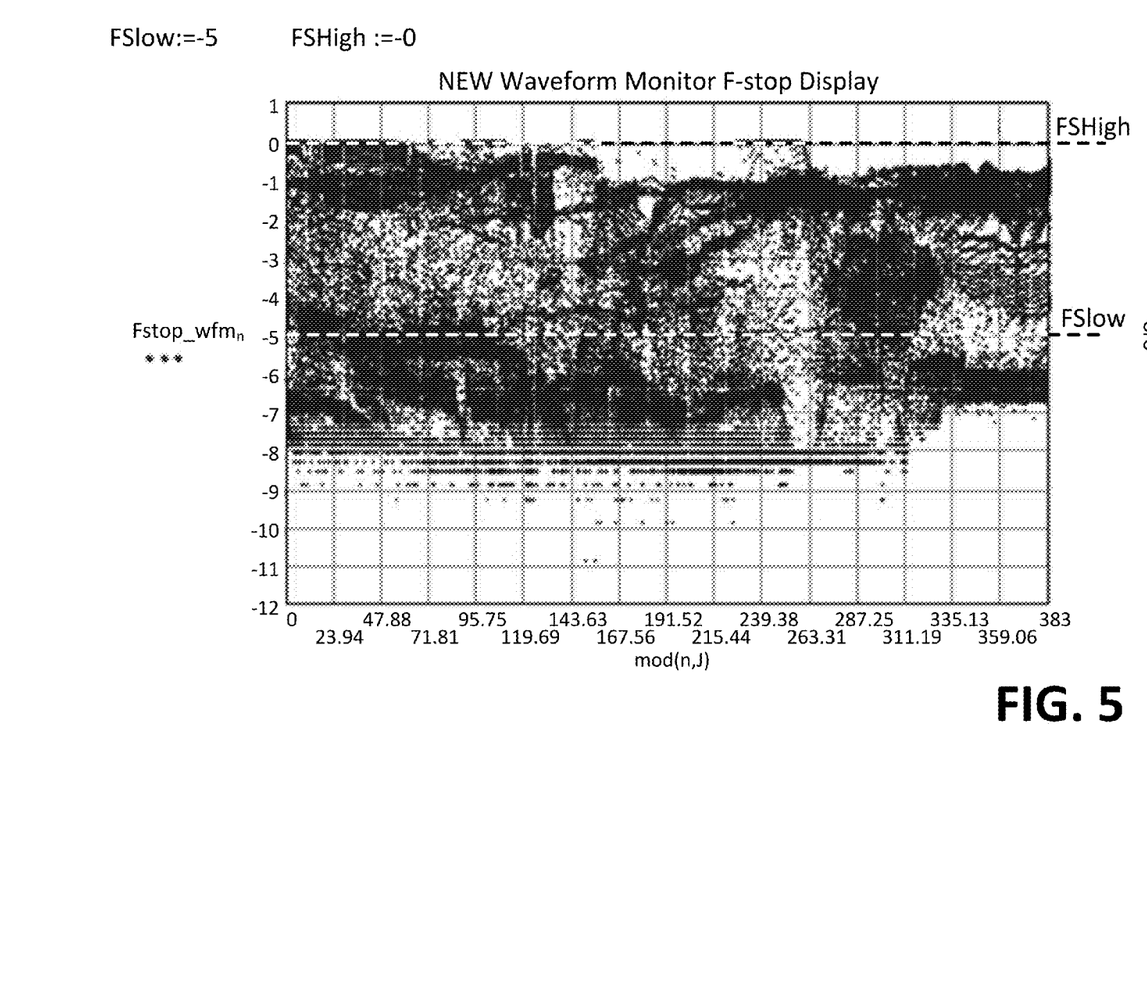
FIG. 5 illustrates an f-stop waveform for the image of FIG. 3, with cursors FSLow and FSHigh, according to embodiments of the invention.

FIG. 4 illustrates the traditional voltage waveform for the image of FIG. 3. FIG. 5, shows a similar output for the original image of FIG. 3, except that FIG. 5 shows an f-stop waveform for the image of FIG. 3, with cursors FSLow and FSHigh, according to embodiments of the invention.

Using embodiments of the invention facilitates camera gain/aperture/speed adjustment along with scene lighting in familiar f-stop units, effectively turning the camera into light meter. For example, using embodiments of the invention allow the user to see on a display an F-stop weighted waveform indication with graduated linear scale in stops, such as illustrated in FIG. 5. Embodiments also allow the user to measure scene hot spots and lighting uniformity in f-stops with dual cursors, by allowing the user to control delta f-stop difference measurement of picture/scene content elements through both waveform and false colored regions on a monochrome picture display. Embodiments further allow for high resolution black balance indications for camera matching and precise black level adjustment and indication of camera noise. Further, embodiments of the invention provide a tool to the user for scene content dynamic range assessment, to allow for artistic optimization.

The Waveform Monitor 20, or any parts of it, may be embodied in firmware, such as an FPGA, specifically designed circuitry such as an ASIC, or may be implemented by one or more software process running on one or more processors. In other embodiments the Waveform Monitor 20 may include may include a combination of components or operations running on firmware, ASICs, FPGAs, and software, for example.

Although specific embodiments of the invention have been illustrated and described for purposes if illustration, it will be understood that various modifications may be made without departing from the spirit and scope of the invention.

What is claimed is:

1. A waveform monitor having an image input and a monitor for viewing a measurement display, the waveform monitor comprising:

a measuring system to measure brightness values for pixels from an original image received at the image input;

a converter structured to generate stop values from the measured brightness values; and an output generator structure to generate a stop versus time waveform.

2. The waveform monitor of claim 1, in which the converter structured to generate stop values comprises a Look Up Table (LUT).

3. The waveform monitor of claim 2, in which the LUT is one of a plurality of previously stored LUTs accessible by the waveform monitor.

4. The waveform monitor of claim 2, in which the LUT is configured to convert the measured brightness values to a $Log_2(Y/Y_{max})$ scale, where Y is a brightness value from the measured brightness values and $Y_{max}$ is a maximum brightness value from the measured brightness values.

5. The waveform monitor of claim 1, in which the converter is further structured to convert the measured brightness values into a linear light representation.

6. The waveform monitor of claim 1, in which the stop versus time waveform includes a Y-axis scaled in stops.

7. A method of generating a display for output from a measurement instrument, the method comprising:

receiving an original image formed of pixels;

extracting brightness information from the pixels;

converting the brightness information of the pixels to stop equivalents; and displaying the stop equivalents versus a time value.

8. The method of claim 7, further comprising iteratively performing the receiving, the extracting, the converting, and the displaying to produce a stop versus time waveform for the stop equivalents.

9. The method of claim 7, in which converting the brightness information of the pixels to stop equivalents includes determining the stop equivalents with a Look Up Table.

10. The method of claim 9, in which determining the stop equivalents with the Look Up Table includes converting the brightness information to a $Log_2(Y/Y_{max})$ scale, where Y is a brightness value within the brightness information and $Y_{max}$ is a maximum brightness value of the brightness information.

11. The method of claim 7, in which converting the brightness information of the pixels to stop equivalents includes determining the stop equivalents with one of a plurality of previously stored Look Up Tables.

12. A system for assessing live video from a camera, comprising:

a camera adapted to generate a video output; and a waveform monitor having an image input coupled to the video output of the camera and a monitor for viewing a measurement display, the waveform monitor comprising:

a measuring system to measure brightness values for pixels from an original image received at the image input;

a converter structured to generate stop values from the measured brightness values; and an output generator structure to generate an stop versus time waveform.

13. A system for assessing live video from a camera of claim 12, in which the converter structured to generate stop values comprises a Look Up Table (LUT).

14. A system for assessing live video from a camera of claim 13, in which the LUT is one of a plurality of previously stored LUTs accessible by the waveform monitor.

15. A system for assessing live video from a camera of claim 13, in which the LUT is configured to convert the measured brightness values to a $Log_2(Y/Y_{max})$ scale, where Y is a brightness value from the measured brightness values and $Y_{max}$ is a maximum brightness value from the measured brightness values.

16. A system for assessing live video from a camera of claim 12, in which the converter is further structured to convert the measured brightness values into a linear light representation.

17. A system for assessing live video from a camera of claim 12, in which the stop versus time waveform includes a Y-axis scaled in stops.

* * * * *